United States Patent [19]

Takemoto

[11] Patent Number: 5,210,564
[45] Date of Patent: May 11, 1993

[54] AUTOMATIC FOCUSING DEVICE EMPLOYING A FREQUENCY DOMAIN REPRESENTATION OF A DIGITAL VIDEO SIGNAL

[75] Inventor: Hiroshi Takemoto, Yokohama, Japan

[73] Assignee: Ricoh Company, Ltd., Tokyo, Japan

[21] Appl. No.: 631,455

[22] Filed: Dec. 21, 1990

[30] Foreign Application Priority Data

Jan. 22, 1990 [JP] Japan ................................. 2-12155

[51] Int. Cl.$^5$ ...................... G03B 13/36; H04N 5/232
[52] U.S. Cl. ..................................... 354/402; 358/227
[58] Field of Search ................ 354/400, 402; 358/227

[56] References Cited

U.S. PATENT DOCUMENTS

| | | | |
|---|---|---|---|
| 3,932,733 | 1/1976 | Olsen et al. | 358/227 X |
| 4,133,606 | 1/1979 | Hosoe et al. | 354/402 |
| 4,561,747 | 12/1985 | Ohno et al. | 354/402 |
| 4,584,704 | 4/1986 | Ferren | 358/227 X |
| 4,814,889 | 3/1989 | Covey | 358/227 X |
| 4,908,644 | 3/1990 | Shindo et al. | 354/402 |
| 4,990,947 | 2/1991 | Komiya et al. | 354/402 |
| 5,043,809 | 8/1991 | Shikakura et al. | 358/133 |
| 5,065,246 | 12/1991 | Takemoto et al. | 358/227 |
| 5,105,278 | 4/1992 | Takemoto | 358/227 |

Primary Examiner—W. B. Perkey
Attorney, Agent, or Firm—Fish & Richardson

[57] ABSTRACT

An automatic focusing device has an A/D converter for converting a supplied video signal to a digital signal; an orthogonal converter for converting a video signal transmitted from the A/D converter to a signal indicative of a frequency component region; and a control section for producing a control signal for performing a focusing operation based on information of the frequency component transmitted from the orthogonal converter. The orthogonal converter performs a discrete cosine transformation with respect to the digitally converted video signal. The orthogonal converter transmits low to high frequency components from the digitally converted video signal. The control section transmits the control signal for performing a focusing operation based on an arbitrary component of the frequency components transmitted from the orthogonal converter. A circuit for performing the focusing operation may be constructed on the basis of a plurality of frequency components.

6 Claims, 1 Drawing Sheet

AUTOMATIC FOCUSING DEVICE EMPLOYING A FREQUENCY DOMAIN REPRESENTATION OF A DIGITAL VIDEO SIGNAL

BACKGROUND OF THE INVENTION

1. Field of the Invention

The present invention relates to an automatic focusing device used in a photographing device to automatically focus a photographed image.

2. Description of the Related Art

In general, a trigonometrical survey method, an infrared ray system, etc. were used in an automatic focusing device used in a photographing device such as a video camera. However, recently, many automatic focusing devices have directly used a signal transmitted from an image pickup device for converting a photographed image to an electric signal in a focusing operation. Such a system is generally called a mountaineering system. This system uses a nature in which the amplitude of a high frequency component of a video signal transmitted from the image pickup device is highest when the photographed image is focused most suitably. A band-pass filter (which is called BPF) is used to obtain this high frequency component and the high frequency component is passed by the band-pass filter from the above video signal.

However, there is a case in which the high frequency component is temporarily highest at a certain timing although no photographed image is focused. Such a phenomenon is called a false peak. There are various kinds of methods for avoiding the false peak. For example, there is a method in which amplitudes of some kinds of high frequency components are simultaneously measured and a true focusing point is judged when all peaks of the high frequency components are in conformity with each other. In this method, it is necessary to use several kinds of band-pass filters so that the number of parts is increased. Further, there is dispersion with respect to heights, widths, etc. of the above peaks in accordance with the photographed image. Therefore, there is a problem about a measuring range of the high frequency components. It is ideal to measure many frequency components and select a most suitable range of the frequency components in accordance with the photographed image. However, in such a method, the number of parts is increased as mentioned above and manufacturing cost is increased.

SUMMARY OF THE INVENTION

It is therefore an object of the present invention to provide an automatic focusing device in which the number of parts and manufacturing cost are reduced and a suitable focusing operation can be performed with respect to various kinds of photographed images.

The above object of the present invention can be achieved by an automatic focusing device comprising an A/D converter for converting a supplied video signal to a digital signal; an orthogonal converter for converting a video signal transmitted from the A/D converter to a signal indicative of a frequency component region; and a control section for producing a control signal for performing a focusing operation based on information of the frequency component transmitted from the orthogonal converter.

In the above automatic focusing device, the A/D converter converts a video signal to a digital signal and the orthogonal converter performs e.g., a discrete cosine transformation with respect to the digitally converted video signal. Thus, the orthogonal converter transmits low to high frequency components from the above video signal. The control section transmits a control signal for performing a focusing operation based on an arbitrary component of the above frequency components transmitted from the orthogonal converter. Accordingly, it is not necessary to dispose a band-pass filter. In particular, when a circuit for performing the focusing operation is constructed on the basis of a plurality of frequency components, it is not necessary to dispose a plurality of band-pass filters so that the number of constructional parts is reduced. Therefore, manufacturing cost is reduced by the control section constructed above and a suitable focusing operation can be performed with respect to various kinds of photographed images.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an automatic focusing device in the present invention will next be described in detail with reference to the accompanying drawings.

Figure 1:
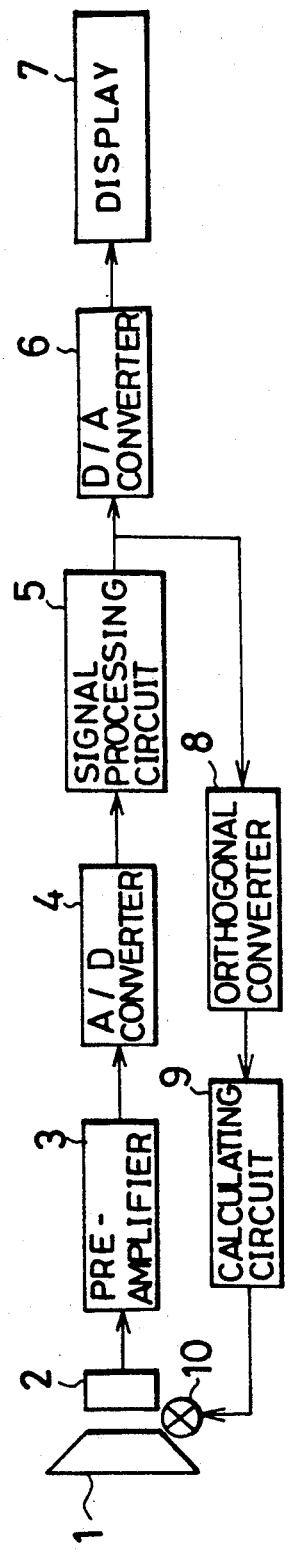
FIG. 1 is a block diagram showing the construction of an automatic focusing device in one embodiment of the present invention.

FIG. 1 shows an automatic focusing device in one embodiment of the present invention. In FIG. 1, a photographed image is obtained through a taking lens 1 constituting a photographing system and is converted by an image pickup device 2 to an electric signal. An output side of the image pickup device 2 is connected to a pre-amplifier 3 for amplifying this electric signal. An output side of the pre-amplifier 3 is connected to an A/D converter 4 for converting an analog video signal transmitted from the pre-amplifier 3 to a digital signal. The A/D converter 4 is connected to a signal processing circuit 5 for processing the above video signal so as to display a picture image on the screen. An output side of the signal processing circuit 5 is connected to a D/A converter 6 for converting a video signal transmitted from the signal processing circuit 5 to an analog signal. The D/A converter 6 is connected to a display 7 for visually displaying the picture image. The output side of the signal processing circuit 5 is also connected to an orthogonal converter 8.

The orthogonal converter 8 is an orthogonal converting circuit for converting a digitally converted video signal to a signal indicative of a frequency region by Fourier transformation, etc. In this embodiment, this video signal is converted to a signal indicative of a frequency region by a discrete cosine transformation (which is called DCT) considered as a standard system for encoding an image in the future. The discrete cosine transformation is one of many proposed orthogonal transformations. When the above video signal is converted by the orthogonal converter 8 by a two-dimensional discrete cosine transformation, the digitally converted video signal of the photographed image is converted to a signal indicative of the frequency region and is further arranged in an order of a small frequency component.

Figure 2A:
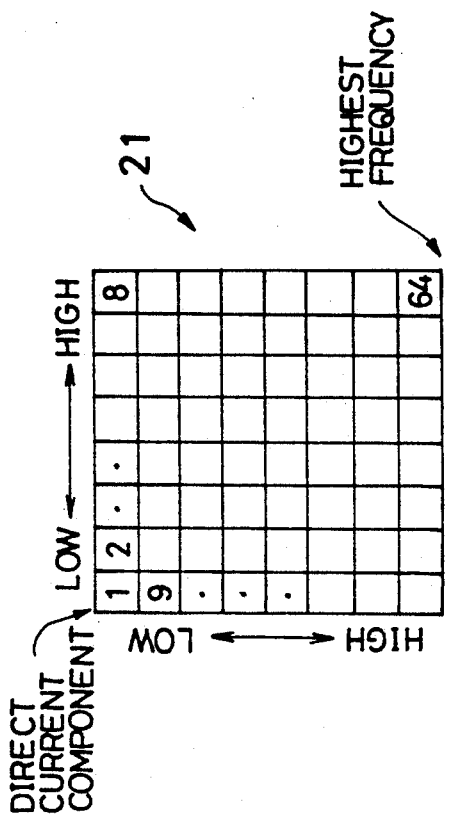
FIGS. 2a and 2b are views schematically showing a discrete cosine transformation (DCT) used in the automatic focusing device in the present invention.
Figure 2B:
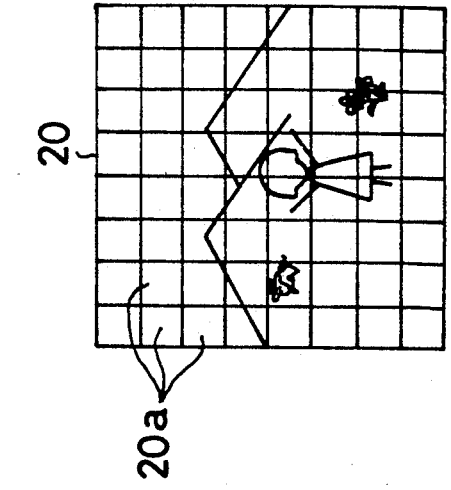

The discrete cosine transformation will next be described in detail with reference to FIGS. 2a and 2b. As shown in FIG. 2a, for example, a photographed image 20 is constructed by 8 picture elements in each of transversal and longitudinal directions. In this case, the discrete cosine transformation is performed by the orthogonal converter 8 with respect to the photographed image 20. As a result, as shown in FIG. 2b, frequency components are obtained in a storing region 21 in the shape of an 8×8 matrix. A direct current component is located at a left upper end of the storing region 21 in FIG. 2b. The frequency components are arranged in the storing region such that frequency is increased as the frequency components are located in the right-hand direction with respect to a row of this matrix and frequency is increased as the frequency components are located in the downward direction with respect to a column of this matrix. Namely, the frequency component at the leftmost uppermost end of the storing region 21 is lowest and the frequency component at the rightmost lowermost end of the storing region 21 is highest.

An output side of the orthogonal converter 8 operated as above is connected to a calculating circuit 9. The calculating circuit 9 basically detects a change in highest frequency component from various kinds of frequency components stored into the above storing region 21, and generates a signal for moving the taking lens 1 so as to maximize this frequency component. This signal is transmitted from the calculating circuit 9 to a motor 10. Since the various kinds of frequency components are transmitted from the orthogonal converter 8, a plurality of frequency components are detected by the calculating circuit 9 and a control signal with respect to a focusing operation is produced to maximize all these frequency components. Thus, it is possible to prevent the photographed image from being focused at a false peak as in the general automatic focusing device.

The operation of the above-mentioned automatic focusing device in this embodiment will next be described.

A video signal is transmitted from the image pickup device 2 and is amplified by the pre-amplifier 3. Thereafter, the video signal is converted from an analog signal to a digital signal by the A/D converter 4 and is processed by the signal processing circuit 5 as mentioned above. The video signal transmitted from the signal processing circuit 5 is visually displayed by the display 7 through the D/A converter 6. Further, the video signal is transmitted to the orthogonal converter 8 to perform the above-mentioned orthogonal transformation. Information about the results of this orthogonal transformation is transmitted to the calculating circuit 9. The calculating circuit 9 detects e.g., a change in highest frequency component from various kinds of frequency components supplied from the orthogonal converter 8. The calculating circuit 9 then generates a control signal for moving the taking lens 1 such that this frequency component is maximized. As mentioned above, the calculating circuit 9 may detect changes in a plurality of frequency components from the supplied frequency components and generate a control signal for performing a focusing operation.

In the automatic focusing device in this embodiment, a video signal is converted from an analog signal to a digital signal and the discrete cosine transformation is performed with respect to digital information. Thus, a plurality of frequency components in the video signal can be obtained at once. Accordingly, for example, it is not necessary to use a bandpass filter to obtain a high frequency component as in the general automatic focusing device. In particular, it is not necessary to dispose a plurality of band-pass filters to obtain a plurality of frequency components so that the number of parts is not increased, thereby restraining the increase in manufacturing cost. Further, it is possible to obtain all frequency information by performing the discrete cosine transformation without limiting the frequency component to a particular one. Accordingly, it is possible to perform an optimal focusing operation with respect to various images by combining plural kinds of frequency components from the frequency information with each other and detecting these changes, thereby improving the accuracy in focus.

As mentioned above, in accordance with the present invention, a plurality of frequency components are obtained by the orthogonal transformation of a digitally converted video signal. Accordingly, it is not necessary to dispose a band-pass filter. In particular, it is not necessary to use a plurality of band-pass filters in a circuit for preventing a focusing operation from being performed in error at a false peak so that the number of parts and manufacturing cost can be reduced. Further, the change in an arbitrary frequency component can be detected by transmitting a plurality of frequency components from the orthogonal converter so that a suitable focusing operation can be performed with respect to various kinds of photographed images.

Many widely different embodiments of the present invention may be constructed without departing from the spirit and scope of the present invention. It should be understood that the present invention is not limited to the specific embodiments described in the specification, except as defined in the appended claims.

What is claimed is:

1. An automatic focusing device comprising:
   an A/D converter for converting a supplied video signal to a digital signal;
   orthogonal conversion means for converting the digital signal from the A/D converter to a two-dimensional frequency domain representation;
   control means for producing a focusing control output based on a plurality of frequency components included in the two-dimensional frequency domain representation; and
   a focusing circuit responsive to the focusing control output for performing a focusing operation such that all of said plurality of frequency components are maximized.

2. An automatic focusing device as claimed in claim 1, wherein the orthogonal conversion means performs a discrete cosine transformation with respect to the digital signal from the A/D converter.

3. An automatic focusing device as claimed in claim 2, wherein the orthogonal conversion means transmits low to high frequency components from said digitally converted video signal.

4. An automatic focusing device as claimed in claim 1, wherein said plurality of frequency components are chosen arbitrarily from the two-dimensional frequency domain representation.

5. An automatic focusing device as claimed in claim 1, wherein one of said plurality of said frequency components is the highest frequency component included in the two-dimensional frequency domain representation.

6. An automatic focusing device as claimed in claim 1, wherein said control means comprises calculating means for calculating the focusing control output.

* * * * *